Jan. 5, 1960

A. J. FISHER

STABLE MULTIVIBRATOR 2,920,247

Filed Aug. 12, 1955

2 Sheets-Sheet 1

INVENTOR
Andrew J. Fisher
BY R. E. Fowler
ATTORNEY

Jan. 5, 1960 A. J. FISHER 2,920,247

STABLE MULTIVIBRATOR

Filed Aug. 12, 1955 2 Sheets-Sheet 2

INVENTOR
Andrew J. Fisher
BY
R. E. Fowler
ATTORNEY

United States Patent Office 2,920,247

Patented Jan. 5, 1960

2,920,247

STABLE MULTIVIBRATOR

Andrew J. Fisher, Independence, Mo., assignor to General Motors Corporation, Detroit, Mich., a corporation of Delaware Application August 12, 1955, Serial No. 527,973

2 Claims. (Cl. 317—130)

This invention relates to alternating current generating means and more particularly to oscillatory circuits of the multivibrator type for generating alternating current. Oscillator means utilized as sources for alternating current power are frequently used for providing alternating current power to control means to actuate certain desired control apparatus. For example, an oscillator in certain control circuits may be quiescent during certain periods and be placed in operation by the appearence of certain condition which create signals. These signals when applied to the oscillator cause the same to go into oscillation. As an example of one instance in which such an oscillatory circuit is useful is a light sensitive control system wherein the amount of light falling on a photosensitive cell may be made to actuate a relay. In such a case the oscillator or multivibrator may be quiescent during periods of no light or very little light in the vicinity, but be triggered into operation upon the appearance of a certain given quantity of light. The output from the multivibrator could then be utilized to actuate a control relay for switching purposes.

It is desirable that the oscillator be turned on quickly to provide substantially full output and it is also desired to cause the oscillator to cease operation in the same manner to give an accurate and fast operation of the switching means actuated thereby. However, in the multivibrator type of oscillator with a control signal applied to the input, as that signal ampltiude gradually decreases, approaching a point at which the multivibrator would cease oscillation, the output of the oscillator also gradually tends to decrease until at a critical point the multivibrator stops. This gradual decrease in oscillator output just prior to complete cessation of oscillation is undesirable if the oscillator controls a switching means It tends to result in inaccurate switching for a given intensity of signal input.

It is an object in making this invention to provide means in a multivibrator oscillator to maintain the output of said oscillator substantially constant in amplitude up to its point of cutoff.

It is a further object in making this invention to provide a multivibrator oscillatory system in which a feedback is supplied from the plate to the control grid of the first section which is 180° out of phase with the input to stabilize the oscillator input, even though the control signal itself may vary.

Figure 1:
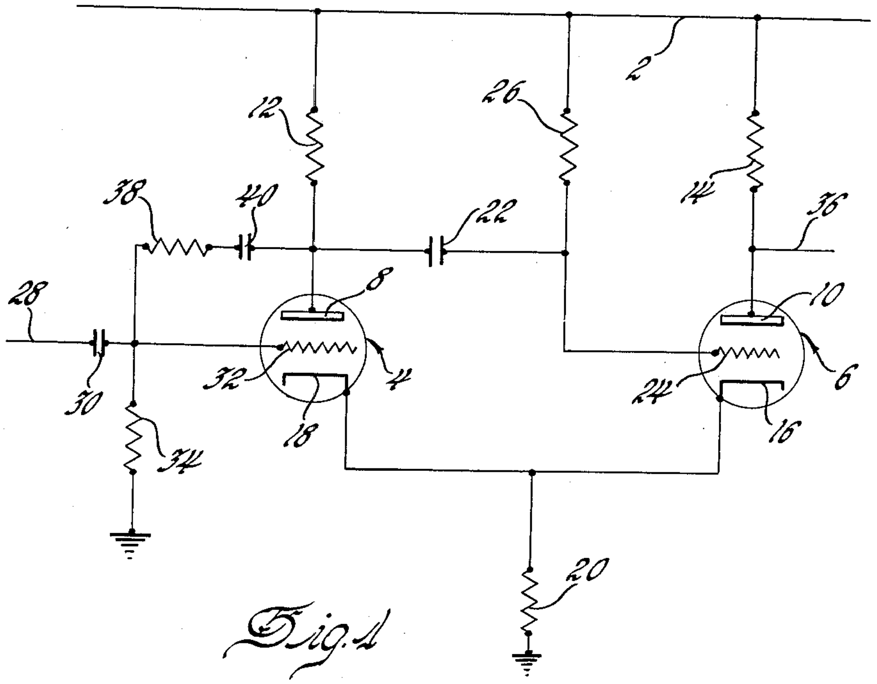
Figure 2:
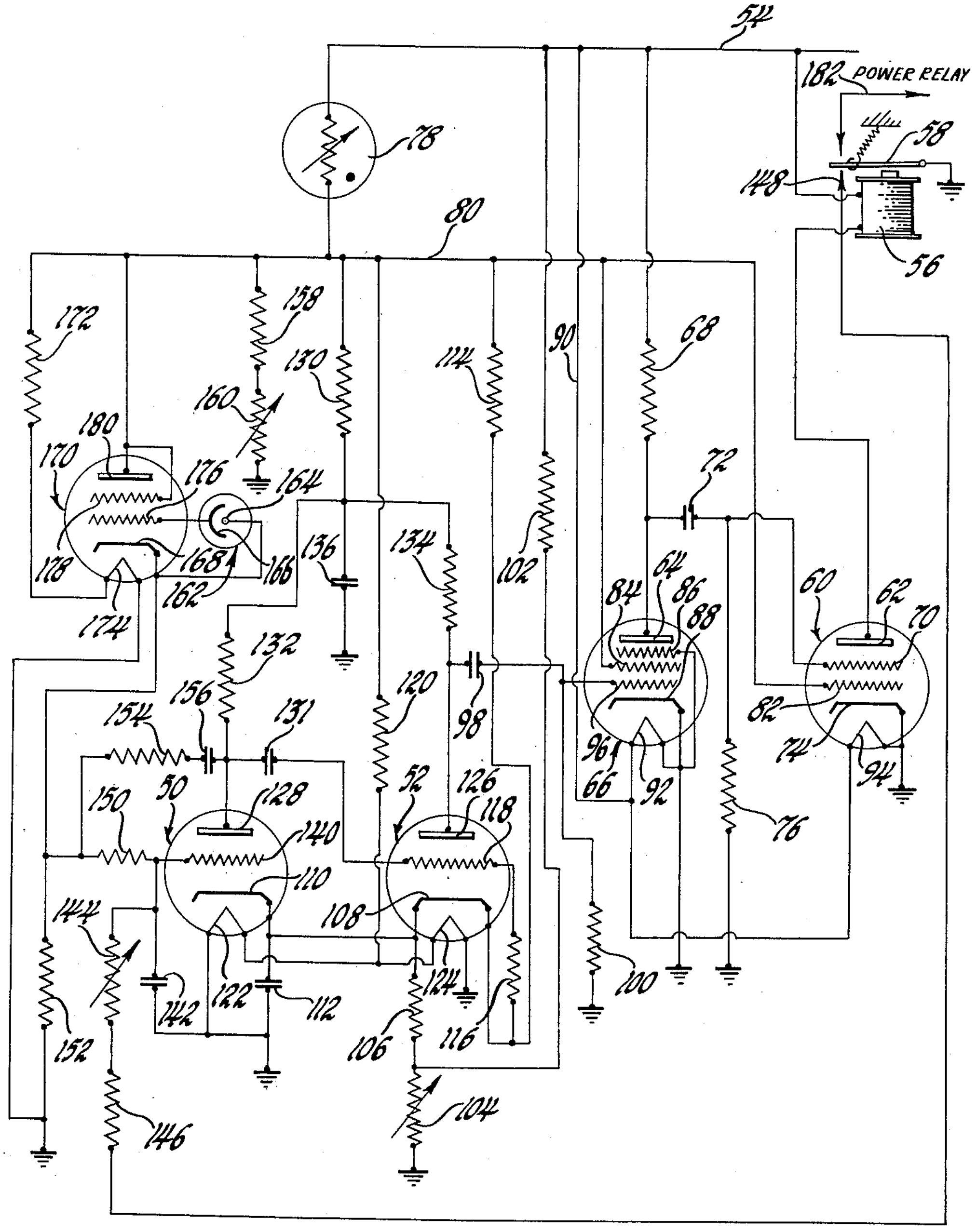

With these and other objects in view which will become apparent as the specification proceeds, my invention will be best understood by reference to the following specification and claims and the illustrations in the accompanying drawings, in which:

Figure 1 is a circuit diagram of a multivibrator incorporating my improved stabilizing means; and Figure 2 is a light sensitive control system incorporating my improved multivibrator system.

Referring now more particularly to Figure 1, which discloses a monostable multivibrator circuit, there is shown therein a main D.C. power supply line 2 which supplies plate voltage to two electron tubes 4 and 6, whose plates 8 and 10 respectively are connected to said power line through dropping resistors 12 and 14. The cathode 16 of the tube 6 is connected directly with cathode 18 of the tube 4 and both are connected to ground through biasing resistor 20. A coupling condenser 22 is connected between plate 8 of the first tube 4 and control grid 24 of the second tube 6. Grid 24 is likewise connected to the power supply line 2 through a resistor 26. The input to the multivibrator is applied to line 28 which is coupled through a condenser 30 to the control grid 32 of the first tube 4. A biasing resistor 34 is connected between control grid 32 and ground.

This much of the multivibrator system is conventional and operates as follows: under normal operating conditions and when the multivibrator circuit is connected to the proper power supply, tube 6 is normally conducting and tube 4 cut off. The current flowing through resistance 20, which is in series with tube 6, creates a sufficient bias on the cathode 18 of the tube 4 to bias off that tube. This condition continues as long as there is no input signal on line 28. When a sufficient control voltage is applied to grid 32 of the tube 4, that tube will begin to conduct and this will cause tube 6 to become nonconductive inasmuch as grid 24 of the tube 6 will be driven negative when tube 4 conducts, since the voltage on plate 8 will be reduced which reduces the voltage on grid 24, in an obvious manner. However, as soon as this condition arises, the condenser 22 will begin to charge through a circuit from line 2 through resistance 26, condenser 22, tube 4 and biasing resistor 20 to ground, which will tend to increase the voltage on the grid 24 of the tube 6. When the voltage on the grid 24 reaches a critical value tube 6 will again conduct, which will return the cathode bias to the tube 4 and it will again cut off. This action will continue to be repeated as long as a sufficiently high input signal is applied to the control grid 32.

The alternating current output from the oscillator so formed may be taken off at a variety of places, but perhaps the more conventional is a connection 36 from the plate 10 of the tube 6. This is the multivibrator operation. However, where the output from line 36 is used to control a relay, perhaps through an amplifying circuit, it is desirable to have the oscillator both trigger quickly and cut off sharply in order to give a clean and accurate control pulse, accurately dependent upon the control voltage levels applied to line 28. Where this control voltage instead of itself having sharp quick amplitude changes is one which may vary more slowly, as it may in a light sensitive circuit, it is desirable to still have the oscillator output remain substantially constant until a critical amplitude is applied and then quickly actuate the relay. With the multivibrator circuit so far described, as the signal applied to line 28 gradually decreases toward a critical value, the amplitude of the pulses supplied by the multivibrator and appearing on line 36 also decrease to some extent.

This is undesirable and in order to provide means for maintaining the amplitude of the output substantially constant until the oscillator cuts off, there is provided a feedback circuit. This circuit consists of resistor 38 in series with condenser 40, connected across the plate 8 and the grid 32 of the first tube 4. This provides a feed back path from the plate 8 to the input grid 32, which is 180° out of phase electrically with the normal input signal fed in on line 28. It therefore tends to compensate or stabilize for any changes in the input signal amplitude. Thus as that amplitude tends to decrease, a certain amount of the signal will be fed back through this circuit to tend to maintain the same amplitude and prevent the output amplitude of the multivibrator from decreasing due to the decrease in signal input. However when a critical value of the voltage applied to line 28 is reached, the multivibrator will cease oscillation quickly. This provides a very sharp and clean control voltage on line 36.

Figure 2 shows my improved multivibrator as incorporated in a light sensitive control system. In that figure the multivibrator section includes two multi-element tubes 50 and 52. The power supply for the system is applied to main line power line 54 which is directly connected to, for example, a storage battery, and is unregulated. This unregulated line supplies power for the control relay coil 56 which actuates an armature 58 for control purposes, as indicated by the dash line. Said armature is spring biased upwardly and is pulled down, as shown in Figure 2, upon energization of the relay coil 56. The main power amplifier control tube 60 controls the flow of current through the relay coil 56. The plate 62 of the tube 60 is connected directly to the relay coil 56 and therethrough to power supply line 54. The unregulated power line 54 also supplies power to the plate 64 of amplifying tube 66 through a dropping resistor 68. The plate 64 is coupled to the control grid 70 of the tube 60 through a coupling condenser 72. The cathode 74 of tube 60 is grounded. A biasing resistor 76 is connected between control grid 70 and ground.

A current regulating means 78 is connected between unregulated power supply line 54 and regulated power supply line 80, the voltage on the latter, of course, being slightly lower than the voltage on the line 54. The regulated supply line 80 is connected directly to screen grid 82 of the tube 60 and also to the screen grid 84 of the amplifying tube 66. The suppressor grid 86 of the tube 66 is connected directly to the cathode 88 and to ground. A conductive line 90, extending from the unregulated power supply line 54, supplies power to both filament 92 of tube 66 and to filament 94 of tube 60.

The control grid 96 of the amplifying tube 66 is capacity-coupled through condenser 98 to the multivibrator output. A biasing resistor 100 is connected between control grid 96 and ground. A dropping resistor 102 is connected in series with a variable resistor 104 between the unregulated power supply line 54 and ground. A resistance 106 is connected from an intermediate point between resistances 102 and 104 and the cathodes 108 and 110 of the multivibrator tubes 52 and 50 respectively. A condenser 112 is connected between cathode 110 and ground. In order to supply biasing potential to the cathode 108, a dropping resistor 114 is connected between said cathode and the regulated power supply line 80. A resistance 116 is connected between cathode 108 and the control grid 118 of tube 52 to apply a bias thereto.

A supply line for the filaments of the two tubes 50 and 52 is provided through a resistor 120 extending from the regulated power supply line 80 to the filaments 122 and 124. The opposite sides of the filaments are grounded. The output of the plate 126 is connected, as before mentioned, through coupling condenser 98 to the control grid 96 of the amplifying stage of the control system. The plate 128 of the first section of the multivibrator is directly connected through coupling condenser 131 with the control grid 118 of the tube 52. The plates 128 and 126 of the tubes 50 and 52 respectively are provided with voltage from the regulated power supply line 80 through a common limiting resistor 130. Each has a separate limiting resistor 132 and 134 respectively directly in series therewith. A condenser 136 is connected between one terminal of limiting resistor 130 and ground.

The control grid 140 of the tube 50 is that to which the control signal is applied to start and stop the multivibrator action. This control grid is connected to ground through a condenser 142 and also through a pair of resistances 144 and 146 in series to a stationary contact 148 on the relay switching means. The resistance 144 is variable. This series circuit provides one path to ground from the control electrode 140 to change the bias thereon, dependent upon the operation of the control relay. The control grid 140 is likewise connected through two series resistances 150 and 152 to ground. This provides a second path to ground upon which a biasing voltage may be developed.

As in the basic multivibrator circuit shown in Figure 1, there is a feedback path provided between the plate 128 of the multivibrator tube 50 and the grid 140 thereof. In this instance this feedback circuit comprises a resistor 154 and a condenser 156 in series therewith connected between plate 128 and a point intermediate resistors 150 and 152. A potentiometer consisting of two resistances in series, namely 158 and 160, the latter being adjustable, are connected between regulated voltage line 80 and ground for the purposes of adjusting the regulated voltage applied to that line. The light sensitive section is shown on the extreme left of Figure 2 and consists in a photosensitive cell 162 having an anode 164 and a cathode 166. The anode is directly connected to the cathode 168 of a D.C. amplifying tube 170, and also to an intermediate point in the series connection between resistors 150 and 152. A limiting resistor 172 is connected between regulated power supply line 80 and one terminal of the filament 174, the opposite terminal of the filament being grounded. This supplies power to the filament. The control grid 176 of the D.C. amplifying tube 170 is directly connected to the cathode 166 of the photoelectric cell 162. The screen grid 178 of the tube is directly connected to the plate 180 thereof, said plate being directly connected to the unregulated power supply line 80.

In the operation of the light controlled circuit shown in Figure 2, the multivibrator section, consisting of tubes 50 and 52, is connected to the output of the D.C. amplifying section consisting of tube 170 whose output is varied in turn by the amount of light falling on the photocell 162. The signal thus produced on the control grid 140 is a fluctuating one which, in some instances, may vary slowly and in others somewhat rapidly. For example, if this light controlled system were to be utilized for the control of automatically dimming the headlights of an automotive vehicle, as a car approached the vehicle upon which this system was mounted, the amount of ambient light falling on the photocell would increase slowly as the car approached. If the two vehicles passed there would be a substantially quick reduction in ambient light to a dark condition if there were no other approaching vehicles. However, if other vehicles were further down the road, then the reduction in light intensity would not be so great and the change in signal voltage likewise not so great.

Normally the system is so designed that there is sufficient conduction through power amplifier tube 60 when no light is falling on the photocell to energize the relay coil 56 and cause it to attract its armature 58. This would thus pull the armature 58 against the lower contact 148, which completes a circuit for the biasing resistors 144 and 146 and deenergizes the power relay indicated as connected to the right-hand end of line 182. At this time the multivibrator section is not oscillating. Assuming now that this condition exists and that the amount of light intensity falling on the photocell begins to increase, this increases the flow through tube 170 and the positive potential on control grid 140 of tube 50 until that tube conducts, which initiates the oscillator or the alternate conduction between tubes 50 and 52 as previously described in relation to Figure 1, and the oscillator produces oscillatory voltage at the output from plate 126. This output is applied to an amplifying stage including tube 66 and thence to the control grid 70 of the power amplifier tube 60. This drives the grid 70 in the negative direction through self-rectifying action, causing relay coil 56 to drop its armature to complete a circuit to the power relay for switching purposes. At the same time it removes from the circuit resistors 144 and 146 to change the bias on grid 140 and the sensitivity on the multivibrator and thus a smaller amount of signal input is now required to maintain the multivibrator section in operation. At this time also the stabilizing or feedback circuit including resistance 154 and condenser 156 supplies signal voltages tending to prevent fluctuations in the input voltage of substantial duration from varying the voltage on the control grid 140. However, when there is a major variation in light intensity on the cell, the multivibrator will cut off quickly and give a sharp accurate action of the relay.

I claim:

1. In a control system, a source of electrical power, a pair of electron tubes forming a monostable multivibrator having an input and an output circuit, said electron tubes each having a plate, grid and cathode, a common resistor connected between both cathodes and ground, resistance means connecting each plate to the source of electrical power, a condenser connected between the first plate and second grid, a further resistor connected between the source of electrical power and the second grid, said input circuit being connected to the first grid and cathode, light sensitive means connected to said source of electrical power and to said input circuit to control the operation of the multivibrator, said output circuit being connected across the second plate and cathode, relay means connected to the output circuit and controlled thereby and a negative feedback circuit including a condenser and resistance in series connected between the first plate and first grid to provide a rapidly changing voltage on said relay with gradual changes above a predetermined level of the input control voltage of the multivibrator due to the variation in light falling on the light sensitive means to cause positive energization and deenergization of the multivibrator to in turn operate the relay switching means.

2. In a multivibrator oscillatory system for actuating switching means accurately and quickly at a given signal level where the control signal value may change slowly, comprising a source of electrical power, a pair of electron tubes forming a monostable multivibrator having an input and an output circuit, said electron tubes having cathodes, plates, and control electrodes connected to the source of electrical power, condenser means connected to the plate of a first tube and the control electrode of a second tube, the means connecting said last named control electrode to the source of electrical power including resistance means to charge the condenser and provide alternate tube conduction and multivibrator action, said input circuit of the monostable multivibrator being connected to the first tube control electrode, means for applying a control voltage whose value varies slowly to the input circuit impedance means connected between the plate of the first tube and the control electrode thereof to provide negative feedback to maintain full positive multivibrator action upon a slow or slight decrease in control voltage applied to the control electrode of the first tube but cut off sharply at a given value, and means connecting the output circuit to the switching means.

References Cited in the file of this patent

UNITED STATES PATENTS

| | | |
|---|---|---|
| 2,280,978 | Roberts | Apr. 28, 1942 |
| 2,312,127 | Shepard | Feb. 23, 1943 |
| 2,375,456 | Wolfner | May 8, 1945 |
| 2,405,237 | Ruhling | Aug. 6, 1946 |
| 2,461,871 | Bass | Feb. 15, 1949 |
| 2,476,389 | Schmidt | July 19, 1949 |
| 2,741,725 | Thomas | Apr. 10, 1956 |

FOREIGN PATENTS

| | | |
|---|---|---|
| 528,806 | Great Britain | Nov. 7, 1940 |
| 535,778 | Great Britain | Apr. 22, 1941 |